US010492466B1

(12) United States Patent
LaMarche

(10) Patent No.: US 10,492,466 B1
(45) Date of Patent: Dec. 3, 2019

(54) PREFILLED SINGLE USE PET BOWL

(71) Applicant: Stephen LaMarche, Philadelphia, PA (US)

(72) Inventor: Stephen LaMarche, Philadelphia, PA (US)

( * ) Notice: Subject to any disclaimer, the term of this patent is extended or adjusted under 35 U.S.C. 154(b) by 169 days.

(21) Appl. No.: 15/689,803

(22) Filed: Aug. 29, 2017

Related U.S. Application Data

(60) Provisional application No. 62/495,115, filed on Sep. 2, 2016.

(51) Int. Cl.
| | |
|---|---|
| *A01K 7/00* | (2006.01) |
| *B65D 21/02* | (2006.01) |
| *B65D 21/08* | (2006.01) |
| *B65D 41/04* | (2006.01) |
| *B65D 47/20* | (2006.01) |
| *B65D 35/46* | (2006.01) |

(52) U.S. Cl.
CPC ............ *A01K 7/00* (2013.01); *B65D 21/0233* (2013.01); *B65D 21/086* (2013.01); *B65D 35/46* (2013.01); *B65D 41/04* (2013.01); *B65D 47/20* (2013.01)

(58) Field of Classification Search
CPC . A01K 7/00; A01K 7/02; A01K 7/005; A01K 7/022; A01K 7/027; A01K 7/06
USPC ............................ 119/74, 77, 72, 51.5, 61.54
See application file for complete search history.

(56) References Cited

U.S. PATENT DOCUMENTS

| | | | | |
|---|---|---|---|---|
| 3,076,435 A | * | 2/1963 | Seymour ................ | A01K 7/005 119/61.54 |
| 5,809,935 A | * | 9/1998 | Kolterman ............... | A01K 7/02 119/74 |
| 6,101,974 A | * | 8/2000 | Frohlich .................. | A01K 7/00 119/51.5 |
| 6,148,767 A | * | 11/2000 | Manchess ................ | A01K 7/00 119/74 |
| 6,276,299 B1 | | 8/2001 | Firstbrook | |
| 8,011,324 B1 | * | 9/2011 | Warganich ............... | A01K 7/02 119/74 |
| 8,397,676 B2 | | 3/2013 | Whitney | |
| 8,601,980 B2 | | 12/2013 | Wacker | |
| 2008/0115732 A1 | * | 5/2008 | Stenberg ................. | A01K 7/02 119/74 |
| 2009/0199776 A1 | | 8/2009 | Alexander | |
| 2010/0101499 A1 | | 4/2010 | Gibson | |
| 2013/0192529 A1 | | 8/2013 | Kruger | |

(Continued)

FOREIGN PATENT DOCUMENTS

DE        3139778 A1    4/1983

*Primary Examiner* — Yvonne R Abbott-Lewis
(74) *Attorney, Agent, or Firm* — Robert J. Yarbrough of Lipton, Winberger & Husick

(57) ABSTRACT

A prefilled single use pet bowl features a body that defines an interior of the pet bowl and also defines a reservoir for water or other liquid for consumption by a pet. An opening communicates between the reservoir and the interior of the pet bowl. The body is deformable by the pet owner and the opening features a selectable closure to allow the pet owner to selectably open the selectable closure and to deform the body of the pet bowl to force water or other liquid through the opening from the reservoir to the interior of the pet bowl. The pet may drink the water through the open top of the interior of the pet bowl.

18 Claims, 21 Drawing Sheets

(56) References Cited

U.S. PATENT DOCUMENTS

2013/0291802 A1* 11/2013 Carpentieri .............. A01K 7/00
                                                                                    119/72
2018/0177153 A1* 6/2018 Matson .................. A01K 7/005

* cited by examiner

PREFILLED SINGLE USE PET BOWL

RELATED APPLICATIONS

This application is entitled to priority from U.S. Provisional Patent Application 62/495,115 filed Sep. 2, 2016 by the inventor herein.

BACKGROUND OF THE INVENTION

A. Field of the Invention

The Invention is a prefilled single use pet bowl where the interior of the bowl that is accessible to a pet may be selectably filled from a reservoir defined by the structure of the bowl. The reservoir can contain a liquid, such as water, for consumption by the pet. A pet owner can selectably fill the interior of the bowl with the water or other liquid from the reservoir defined by the structure of the pet bowl and make the water or other liquid available to the pet.

B. Statement of the Related Art

Bottled water or other beverages are readily available to the human traveler. Animals that lap liquids using their tongues, such as dogs and cats, are not physiologically suited to drink from a conventional water bottle and require an open-topped bowl or other container from which to lap the water. For the purpose of this document, the term 'water' means liquid water and also means any other liquid that a pet owner may wish to provide for consumption by his or her pet.

A person traveling with a pet must either find or carry a bowl from which the pet may drink or risk dehydrating the pet. As used in this document, the term 'bowl' means a vessel that defines an interior that is open-topped and that will hold water. The interior and the open top of the interior are configured to allow a pet to lap, and thereby drink, water contained within the interior of the bowl.

The prior art does not teach the pet bowl of the Invention.

SUMMARY OF THE INVENTION

The Invention is a pet bowl. The pet bowl has a body that defines walls and a base. The walls and base define an interior. The interior has an open top and is configured to hold water so that a pet can drink the water through the open top.

The walls, the base or both the walls and the base define a reservoir. An opening between the reservoir and the interior provides selectable fluid communication between the reservoir and the interior of the pet bowl. The reservoir is sealed by a selectable closure and water does not flow from the reservoir except through the opening and past the selectable closure. The wall, the base or the walls and base may be deformable, as are the walls of the familiar disposable water bottle for human consumption. The body may be resilient so that the pet bowl resumes its original shape after deformation.

To access the water, the pet owner may open the selectable closure and may compress the walls, base or walls and base of the pet bowl, expelling water from the reservoir through the opening and into the interior of the pet bowl. The pet owner may then close the selectable closure and make the pet bowl and the water in the interior of the pet bowl available to the pet. The pet owner can control the amount of water that flows through the opening and hence the amount of water available to the pet by controlling the selectable closure and by controlling the compression of the walls, base, or walls and base. The pet owner can re-seal the selectable opening and save the remaining water in the reservoir for later use.

As a first alternative, both the walls and base of the pet bowl may define the reservoir. As a second alternative, the base and not the walls may define the reservoir. As a third alternative, the walls and not the base may define the reservoir. Where the walls define at least a part of the reservoir, the walls include an inside wall and an outside wall and the space between the inside and outside wall defines the reservoir.

The selectable closure may be a simple cap, such as a screw cap, that the pet owner unscrews to access the water in the reservoir. The selectable closure may be in the form of a removable plug. The removable plug may be attached to the body to avoid loss of the plug. The removable plug may be flush, or nearly so, with the surface of the interior of the pet bowl when in the sealed condition. The selectable closure may be any suitable valve known in the art, such as a pull-to-open, push-to-close valve familiar to users of conventional disposable water bottles for human consumption. The pull-to-open, push-to-close valve may be equipped with a side discharge rather than the conventional end discharge to keep the water in the interior of the pet bowl. The selectable closure may be located at the bottom of the interior at the base of the body. Alternatively, the selectable closure may be located on the inside wall of the body.

The selectable closure may be equipped with a back flow prevention apparatus to prevent water within the interior of the pet bowl from flowing back into the reservoir through the opening. The backflow prevention apparatus may be in the form of a check valve.

The circumference of the top edge of the pet bowl is larger than the circumference of the base of the pet bowl. As a result, the pet bowl containing water in the reservoir may be conveniently stacked with other pet bowls and may be conveniently shipped, stored, and sold alongside bottled water for human consumption.

The base or walls of the pet bowl may define accordion folds to allow the base or walls to collapse uniformly as the pet owner compresses the base or walls to expel water from the reservoir through the opening and into the interior of the pet bowl. The accordion folds allow a greater ultimate volume of water storage within the reservoir. The accordion folds also allow the pet owner to asymmetrically deform the accordion folds so that the open top of the pet bowl is in a level condition even if the base of the pet bowl rests on a sloping surface.

The pet bowl of the Invention allows a pet owner to conveniently carry water for a pet, as in tote bag, purse, backpack, or in a vehicle without risk of spillage. The pet bowl also allows a pet owner to travel without carrying a bowl or water for the pet because the pet owner can purchase the pet bowl, already charged with water, as needed.

In an alternative embodiment, the body has a first position and a second position and is movable between the first and second positions. In the first position, the body defines a water bottle. In the second position, the body defines a pet bowl. The body of this alternative embodiment has a first end, a second end, and a central portion intermediate between the first and second ends. The circumference of the center portion is greater than the circumference of the first end or the second end. The opening communicating with the reservoir is disposed proximal to the first end. In the first position, the first end is distal to the second end. In the second position, the body is collapsed so that first end is proximal to the second end and the distance between the first end and the second end is less than the distance between the center portion and the second end. For the alternative embodiment, the outside surface of the first end of the water bottle when the body is at the first position defines the inside surface of the interior of the pet bowl when the body is in the second position.

This alternative embodiment allows a water bottle for human consumption and the pet bowl to be one and the same. The pet owner can drink a portion of the water in the water bottle, can convert the partially-filled water bottle into a pet bowl, and can provide the water in the reservoir of the pet bowl to the pet.

The bowl of the Invention also may be used for products for human consumption, such as to dispense milk for a pre-packaged single serving of a breakfast cereal. The breakfast cereal may be contained within the interior of the bowl and the milk disposed in the reservoir. The consumer compresses the wall, the base, or the walls and base to expel milk from the reservoir through the opening and onto the breakfast cereal to moisten the breakfast cereal. The user then consumes the moistened breakfast cereal through the open top of the interior using a spoon. The bowl of the Invention may be used for any other application where a single serving of a liquid for human consumption is to be consumed from a bowl.

DESCRIPTION OF AN EMBODIMENT

Figure 1:
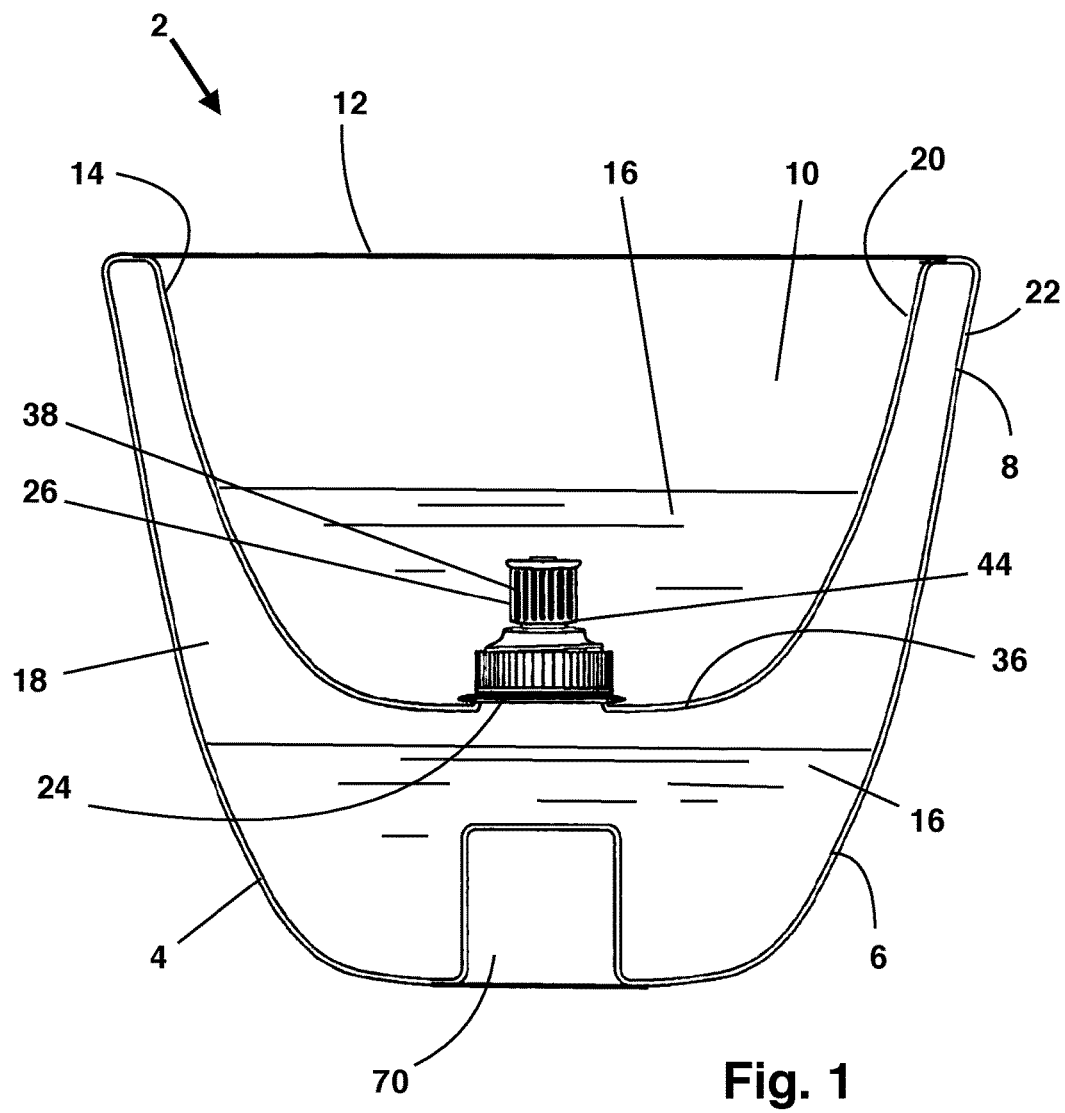
FIG. 1 is a sectional side view of the pet bowl in which the reservoir is defined by the walls and base.
Figure 2:
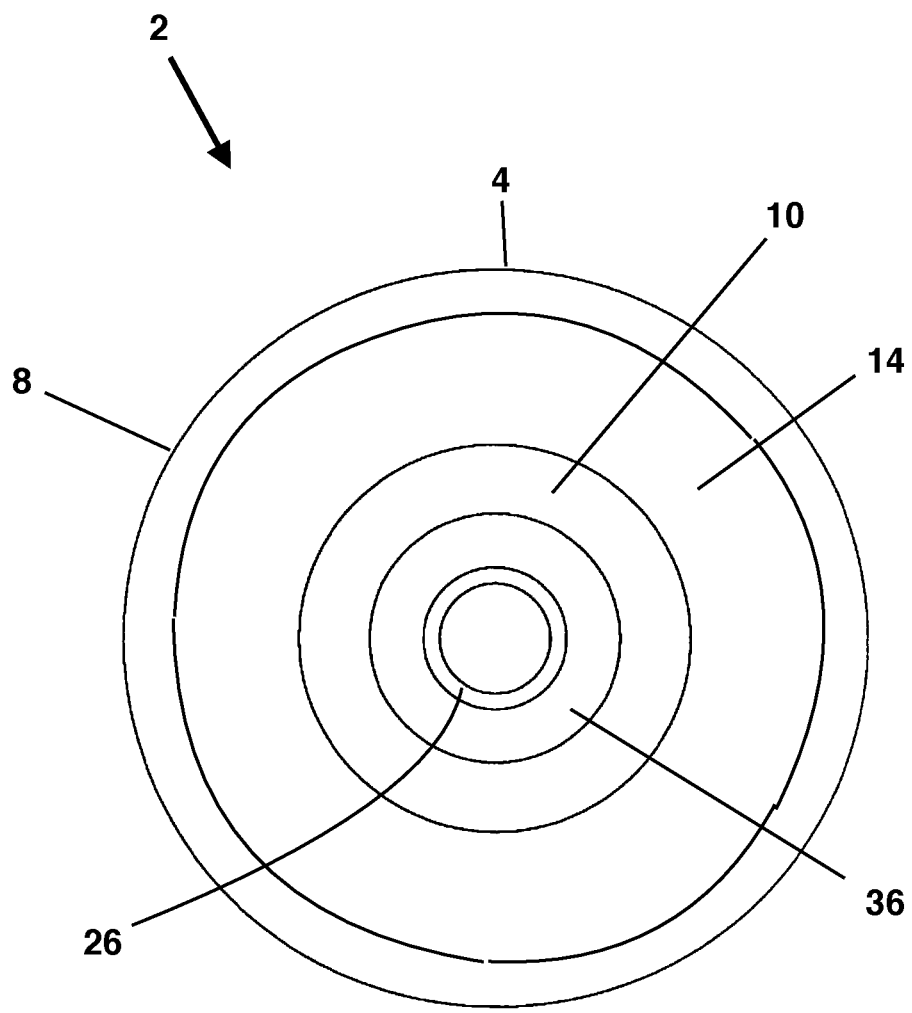
FIG. 2 is a plan view of the pet bowl.
Figure 3:
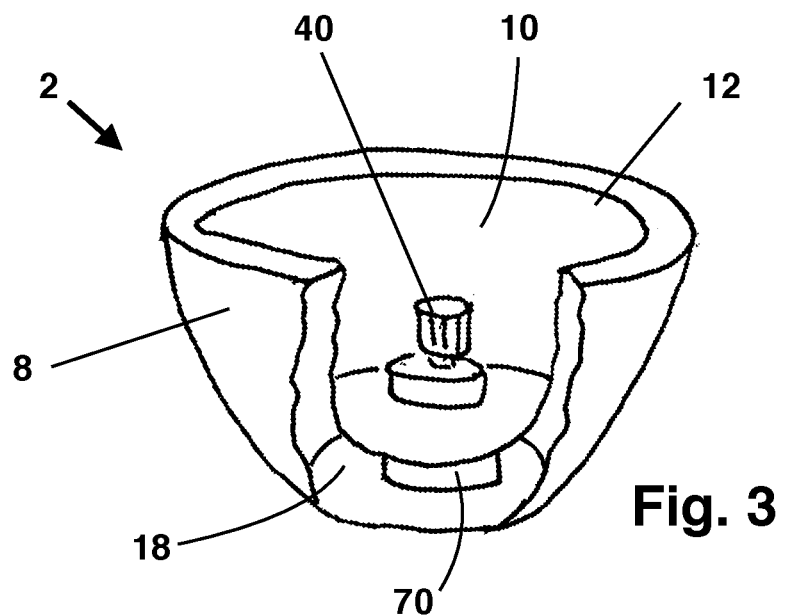
FIG. 3 is a cutaway perspective view of the top side of the pet bowl.
Figure 4:
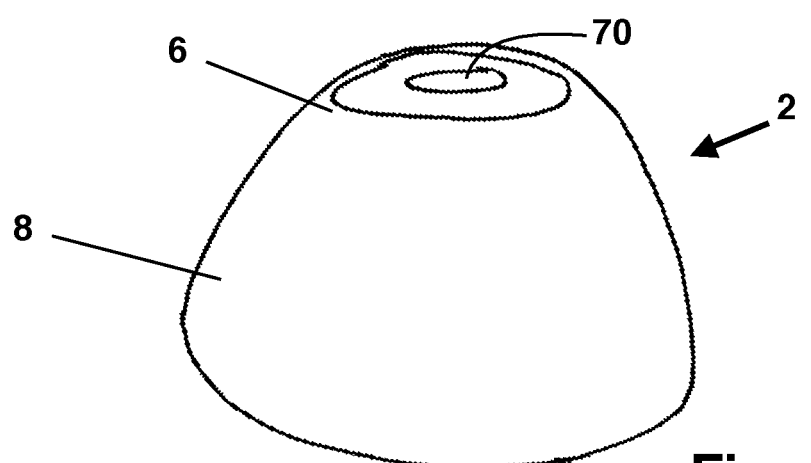
FIG. 4 is a perspective view of the bottom side of the pet bowl.

FIGS. 1 through 4 show a first embodiment of the pet bowl 2 of the Invention. FIG. 1 is a partial sectional side view of the pet bowl 2. FIG. 2 is a plan view of the pet bowl 2. FIG. 3 is a cutaway perspective view of the top side of the pet bowl 2. FIG. 4 is a perspective view of the bottom side of the pet bowl 2.

From FIG. 1, the pet bowl 2 has a body 4. The body 4 defines a base 6 and a wall 8. The base 6 and wall 8 in cooperation define an interior 10 of the pet bowl 2. The interior 10 has an open top 12 and defines an inside surface 14. The interior 10 is configured to hold water 16. As noted above, the term 'water 16' means liquid phase water and also means any other liquid that a pet owner may wish to provide to a pet. A pet owner may allow a pet to access the water 16 contained within the interior 10 through the open top 12 and to drink the water 16.

From FIGS. 1 and 3, the body 4 defines a reservoir 18. The reservoir 18 is configured to contain water 16 with which to charge the interior 10. In the embodiment of FIGS. 1 and 3, the reservoir 18 is defined by both the base 6 and wall 8 of the body 4. The space between the inside wall 20 and the outside wall 22 defines the reservoir 18.

From FIG. 1, an opening 24 allows fluid communication between the reservoir 18 and the interior 10. The opening is sealable by a selectable closure 26, so the fluid communication between the reservoir 18 and interior 10 also is selectable. The selectable closure 26 allows the pet owner to open the selectable closure 26, manually compress the body 4 to force water 16 from the reservoir 18 and into the interior 10, and to close the selectable closure 26 to save the remaining water 16 in the reservoir 18 for later use. The pet owner can then provide the pet bowl 2 to the pet, which can drink the water 16 contained within the interior 10 through the open top 12.

Figure 5:
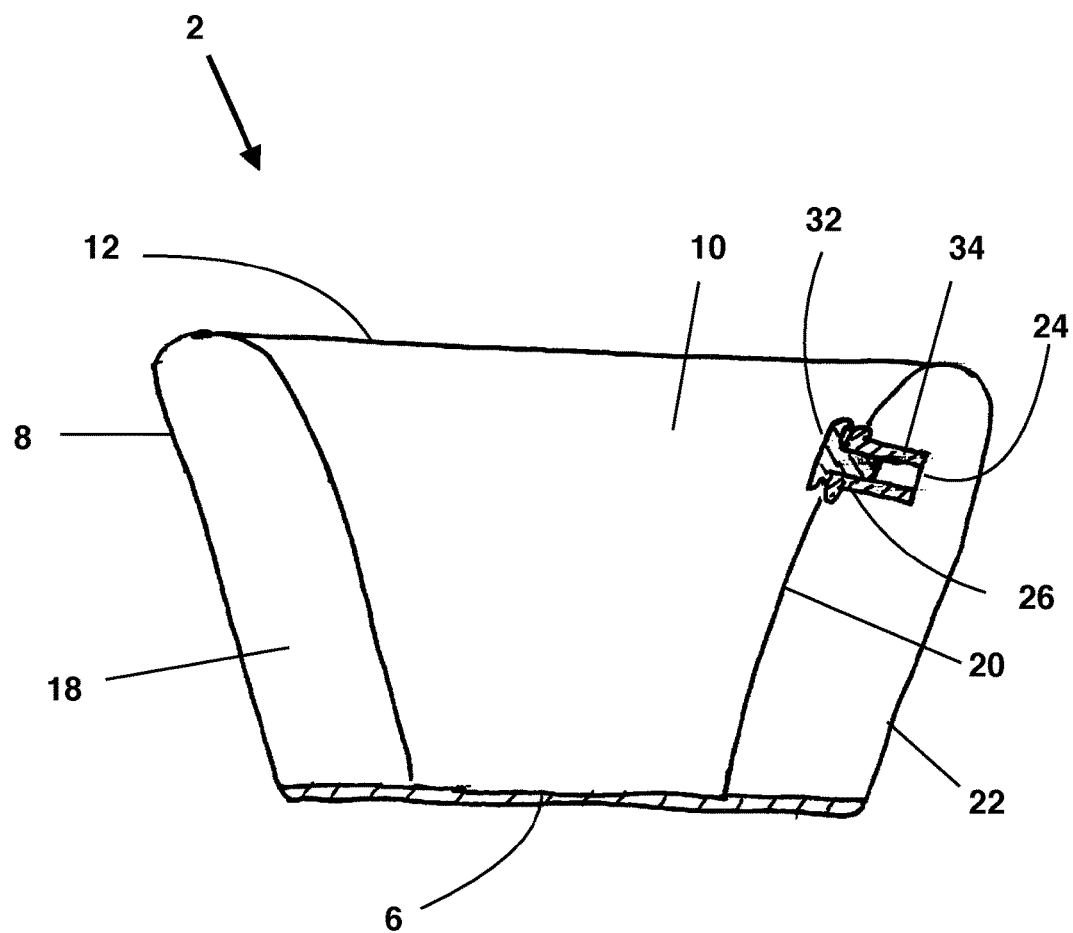
FIG. 5 is a sectional side view of the pet bowl in which the reservoir is defined by the walls.
Figure 6:
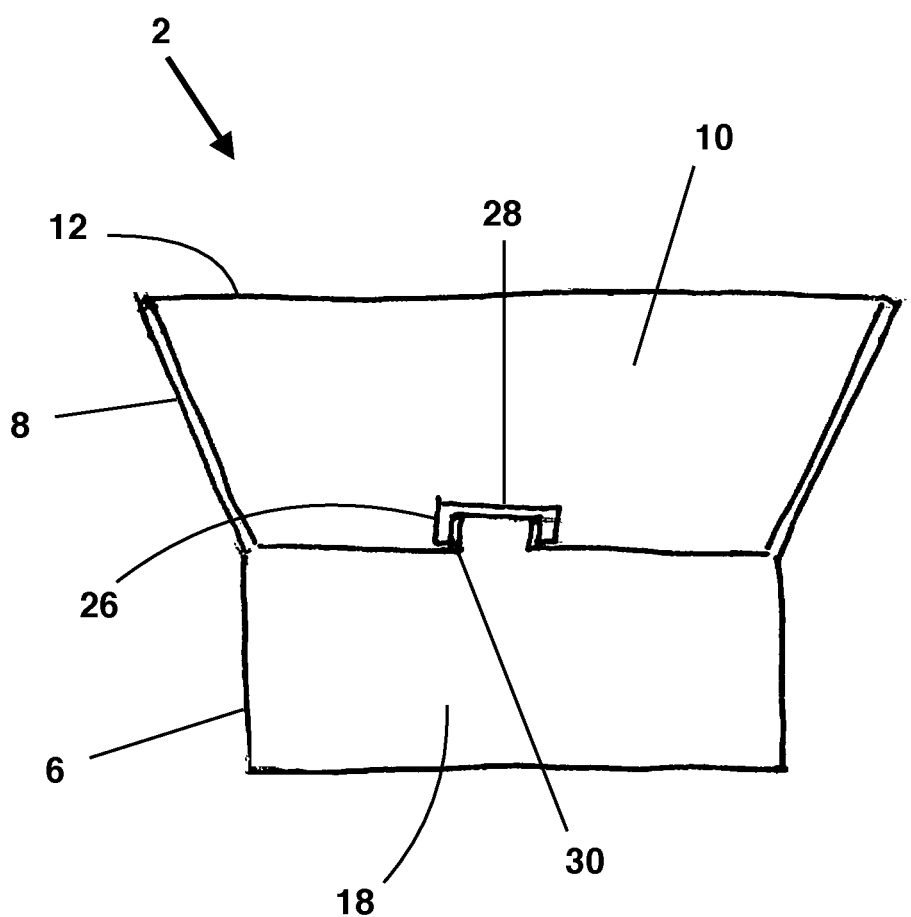
FIG. 6 is a sectional side view of the pet bowl in which the reservoir is defined by the base.

FIGS. 1 and 3 illustrate an embodiment where the reservoir 18 is defined by both the wall 8 and base 6. FIG. 5 illustrates an alternative embodiment in which the reservoir 18 is defined by the wall 8 but not by the base 6. FIG. 6 illustrates another alternative embodiment where the reservoir is defined by the base 6 but not by the wall 8. Each of these alternatives is contemplated by the Invention.

Figure 7:
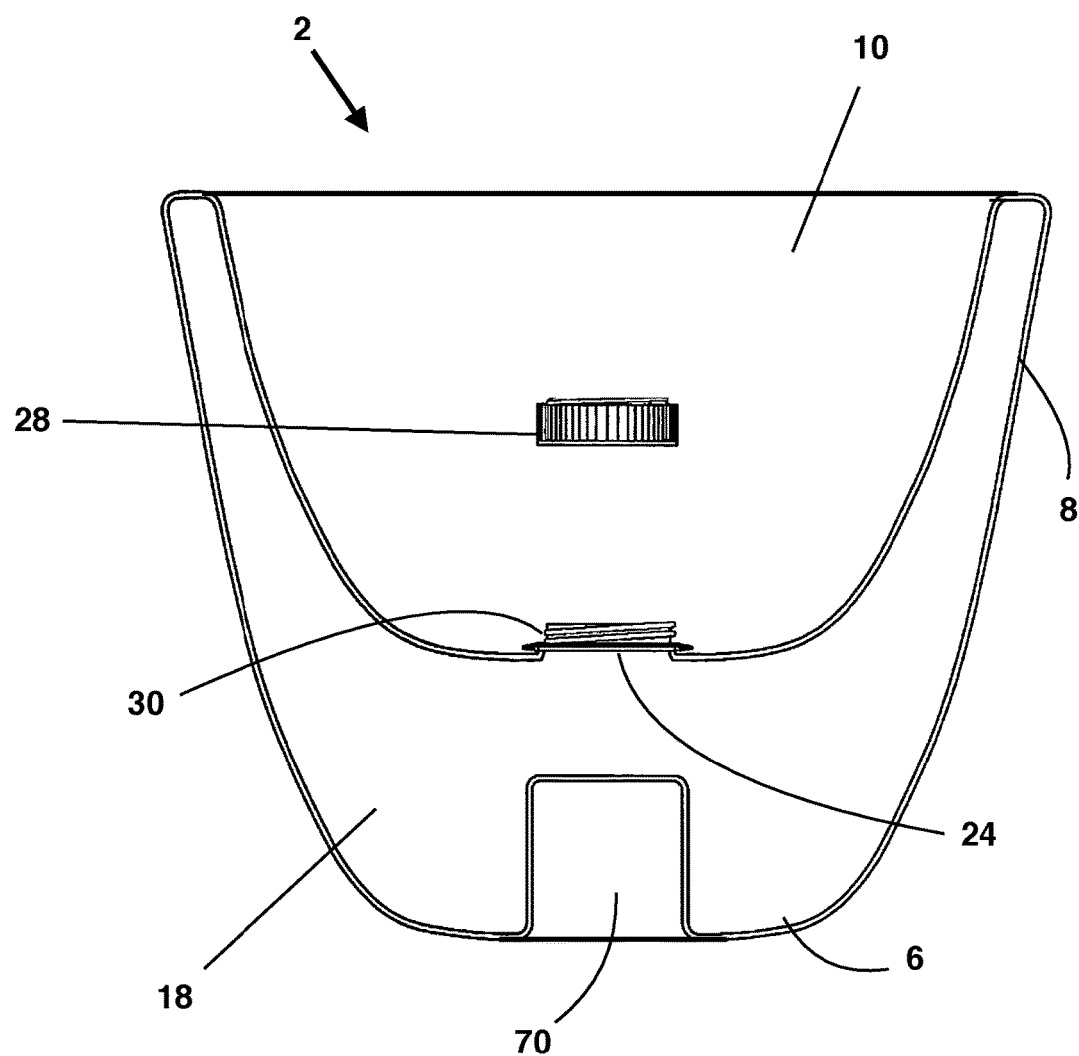
FIG. 7 is a sectional side view of the pet bowl in which the selectable closure is a screw cap.

As shown by the exploded sectional side view of FIG. 7, the selectable closure may be a screw cap 28. The screw cap 28 engages threads 30 on the body 4 to seal the water inside the reservoir 18. The pet owner unscrews the screw cap 28 to unseal the opening 24 and to allow water 16 to flow from the reservoir 18 to the interior 10. Replacing the screw cap 28 re-seals the reservoir 18. FIG. 7 is an exploded view showing the screw cap 28 separated from the thread 30. FIG. 6 is a sectional view that shows the screw cap 28 in position and sealing the opening 24.

Figure 8:
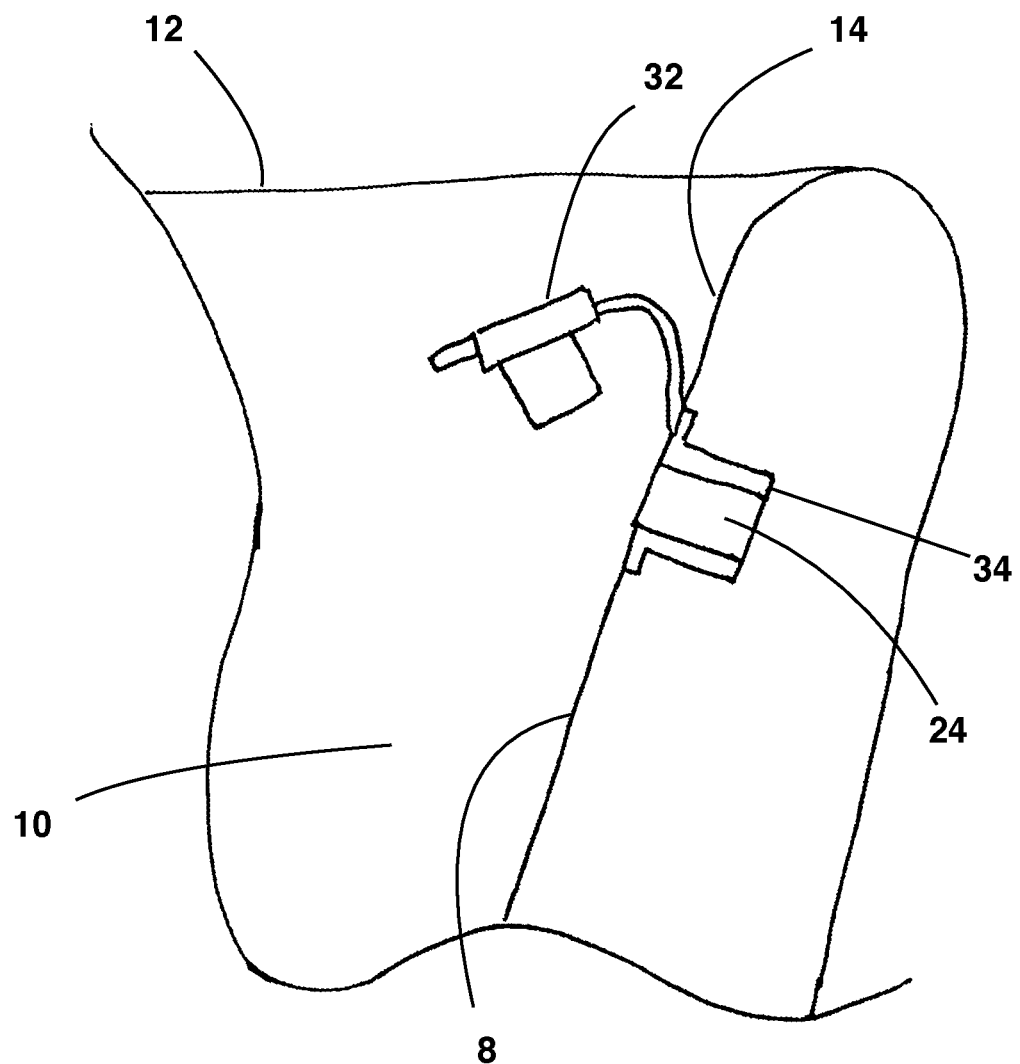
FIG. 8 is a sectional side view of the pet bowl in which the selectable closure is removable plug disposed on the wall of the interior.

The selectable closure 26 may take the form of a removable plug 32, shown by FIG. 8 and by FIG. 5. FIG. 8 is a detail sectional view of the wall 8 where the wall 8 defines at least a portion of the reservoir 18. The removable plug 32 selectably seals a plug receptacle 34. The plug receptacle 34 defines the opening 24. FIG. 8 shows the removable plug 32 and plug receptacle 34 in an open condition with water 16 able to move through opening 24. FIG. 5 shows the removable plug 32 and plug receptacle 34 in a sealed condition. In the sealed condition, the removable plug 32 and plug receptacle 34 may be flush or substantially flush with the inside surface 14 of the interior 10 and the removable plug 32 prevents water 16 from flowing from the reservoir 18 to the interior 10. A pet can more readily access the water 16 in the interior 10 where the selectable closure 26 is flush or substantially flush with the inside surface 14.

FIGS. 5 and 8 show the opening 24, removable plug 32 and plug receptacle 34 located proximal to the open top 12 of the interior 10. Locating the opening 24 and any suitable selectable closure 26 near the open top 12 has certain advantages in filling the reservoir 18 with water 16 because almost the entire reservoir 18 can be filled without issues of venting. Locating the opening 24 near the open top 12 also has the advantage that water 16 in the reservoir 18 may be substantially expelled into the interior 10 of the pet bowl 2 and the body 4 of the pet bowl 2 may resiliently draw makeup air through the opening 24 so that the pet bowl 2 may resume its original shape. The opening 24 and any suitable selectable closure 26 may be mounted in other locations, such as at the bottom 36 of the interior 10 as shown by FIGS. 1, 6, 7, 13, 14, 16 and 17. The opening 24 and any selectable closure 26 may be located at any other suitable location, which may be on the inside wall 20 or the bottom 36 of the interior 10.

Figure 9:
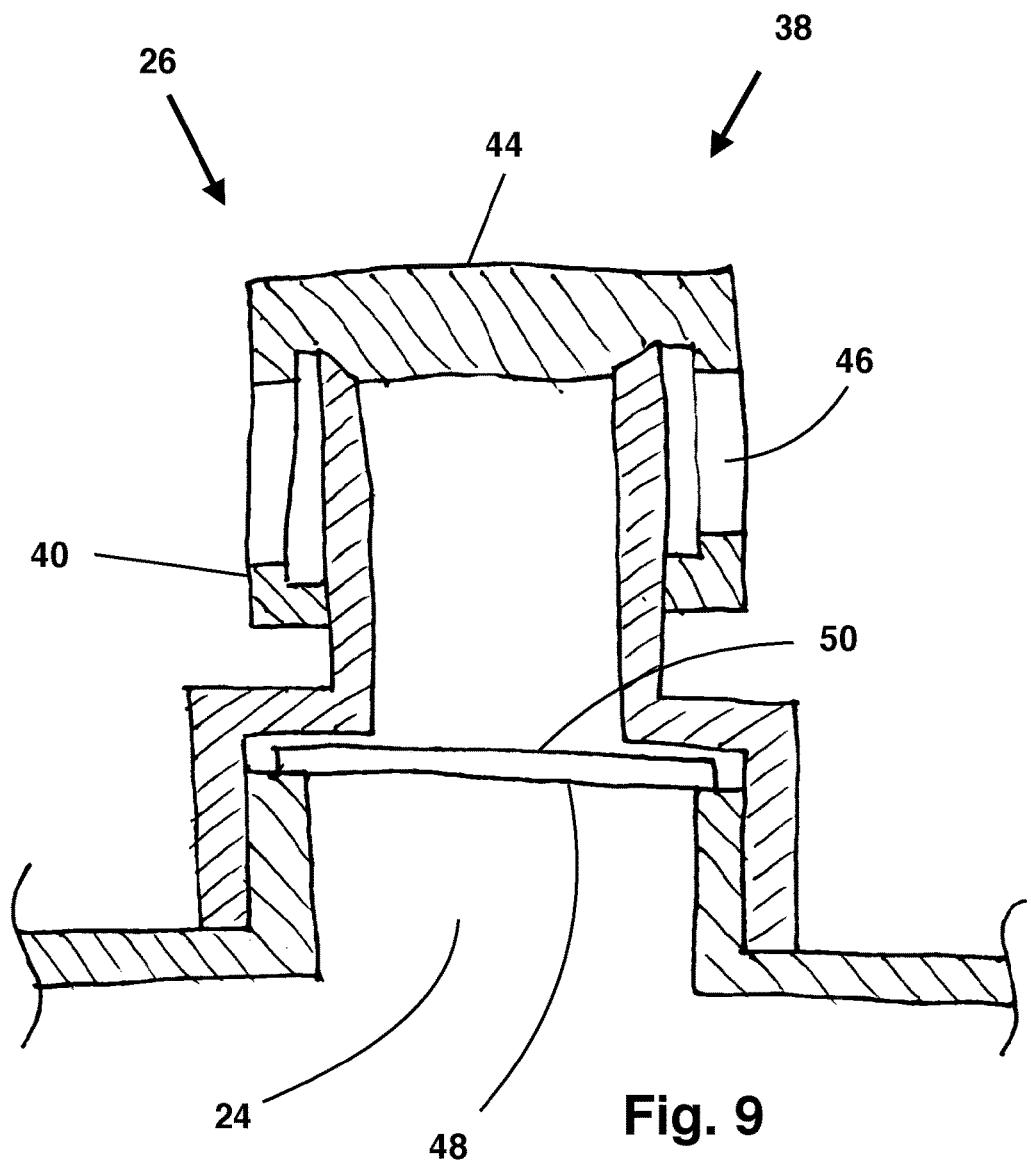
FIG. 9 is a detail sectional side view of a pull-to-open, push-to-close valve in the closed position having a side discharge and a back flow prevention apparatus.
Figure 10:
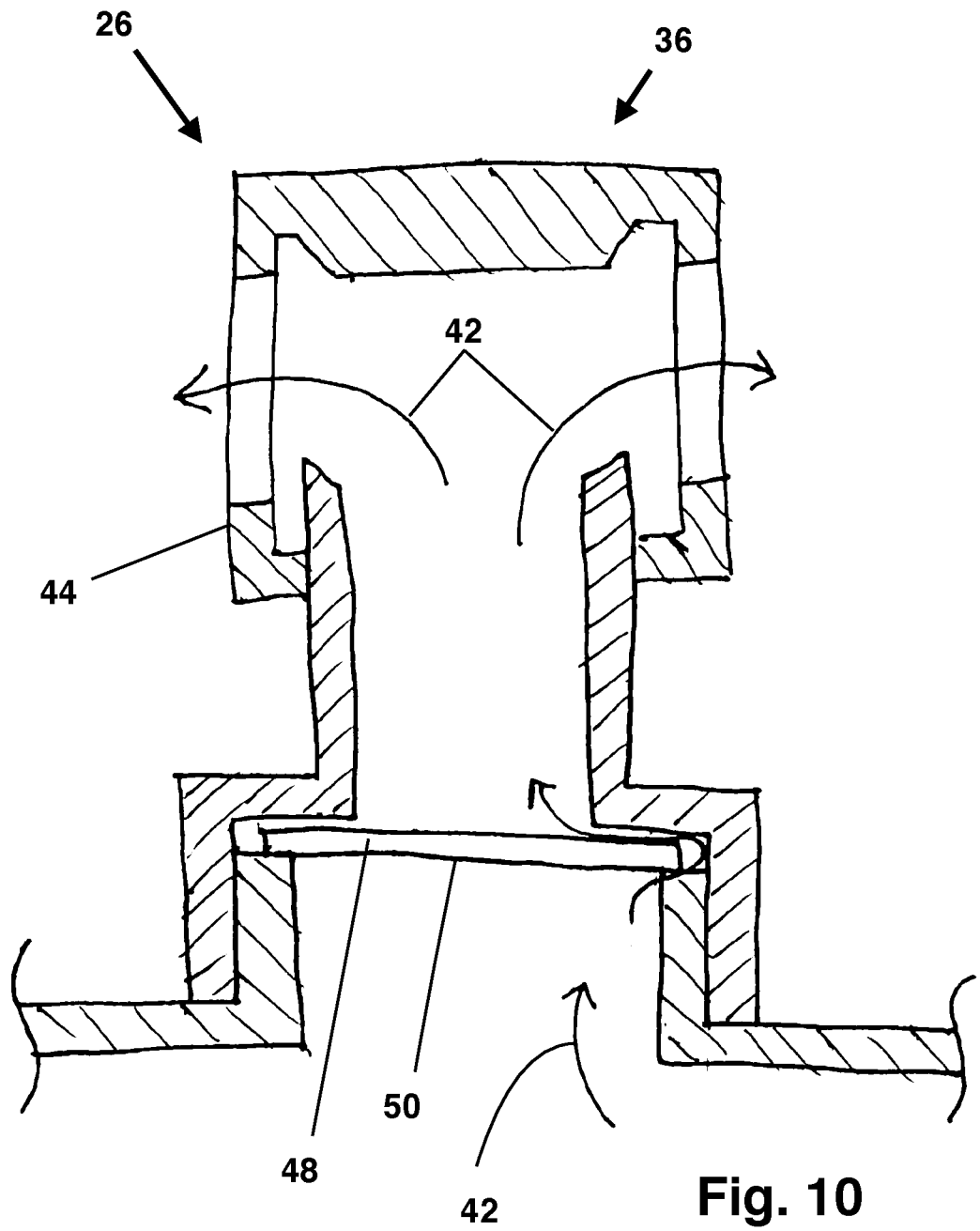
FIG. 10 is a detail sectional side view of the pull-to-open, push-to-close valve of FIG. 9 in the open position.
Figure 11:
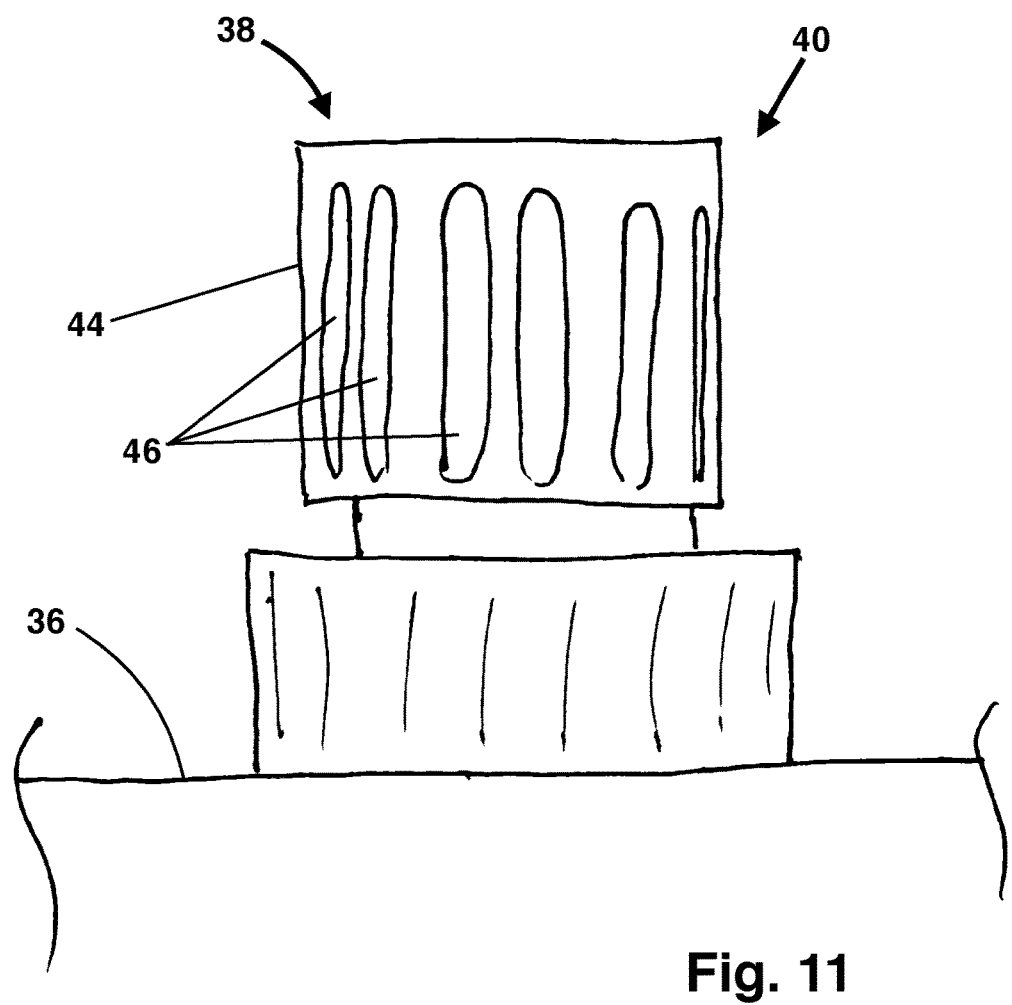
FIG. 11 is a side view of the pull-to-open, push-to-close valve of FIGS. 9 and 10.

FIGS. 9, 10 and 11 illustrate a valve 38 acting as the selectable closure 26. The valve 38 shown by FIGS. 7, 8 and 9 is a pull-to-open, push-to-close valve 40, but any suitable valve 38 known in the art may be the selectable closure 26. FIG. 9 shows the valve 38 in the closed condition, sealing the opening 24 against the passage of water 16. FIG. 10 shows the same valve 38 in the open condition, allowing the passage of water 16. Arrows 42 indicate the flow of water 16 through the valve 38 of FIG. 10. The valve 38 of FIGS. 9, 10 and 11 differs from a conventional pull-to-open, push-to-close valve 40 in that it discharges water 16 from valve openings 46 in the side of the barrel 44 rather than from the end. Discharge through the side of the barrel 44 keeps more of the water 16 in the interior 10 and available to the pet when the pet owner compresses the body 4 and discharges water 16 through the opening 24.

FIGS. 9 and 10 also illustrate that the valve 38 optionally may be equipped with a back flow prevention apparatus 48. The back flow prevention apparatus 48 is useful where the opening 24 and selectable closure 26 are located on the interior 10 where the opening 24 and selectable closure 26 will be immersed in water 16 on the interior 10 during use. The back flow prevention apparatus 48 prevents water 16 from flowing from the interior 10 and into the reservoir 18. The opening 24 and hence the backflow prevention apparatus 48 may be located anywhere on the inside surface 14 of the interior 10 and has limited utility where the opening 24 is above the level of water in the interior 10.

The back flow prevention apparatus 48 of FIGS. 9 and 10 is a passive gravity-operated check valve 50, although a spring may urge the check valve 50 into the closed position. When the pet owner compresses the body 4, water 16 within the reservoir 18 lifts the gravity-operated check valve 50 and moves past the check valve 50 and out the valve openings 50 in the barrel 44. Arrows 42 on FIG. 10 indicate the movement of the water 16 past the check valve 50. The selectable closure 26 may incorporate any backflow prevention apparatus 48 known in the art.

Figure 12:
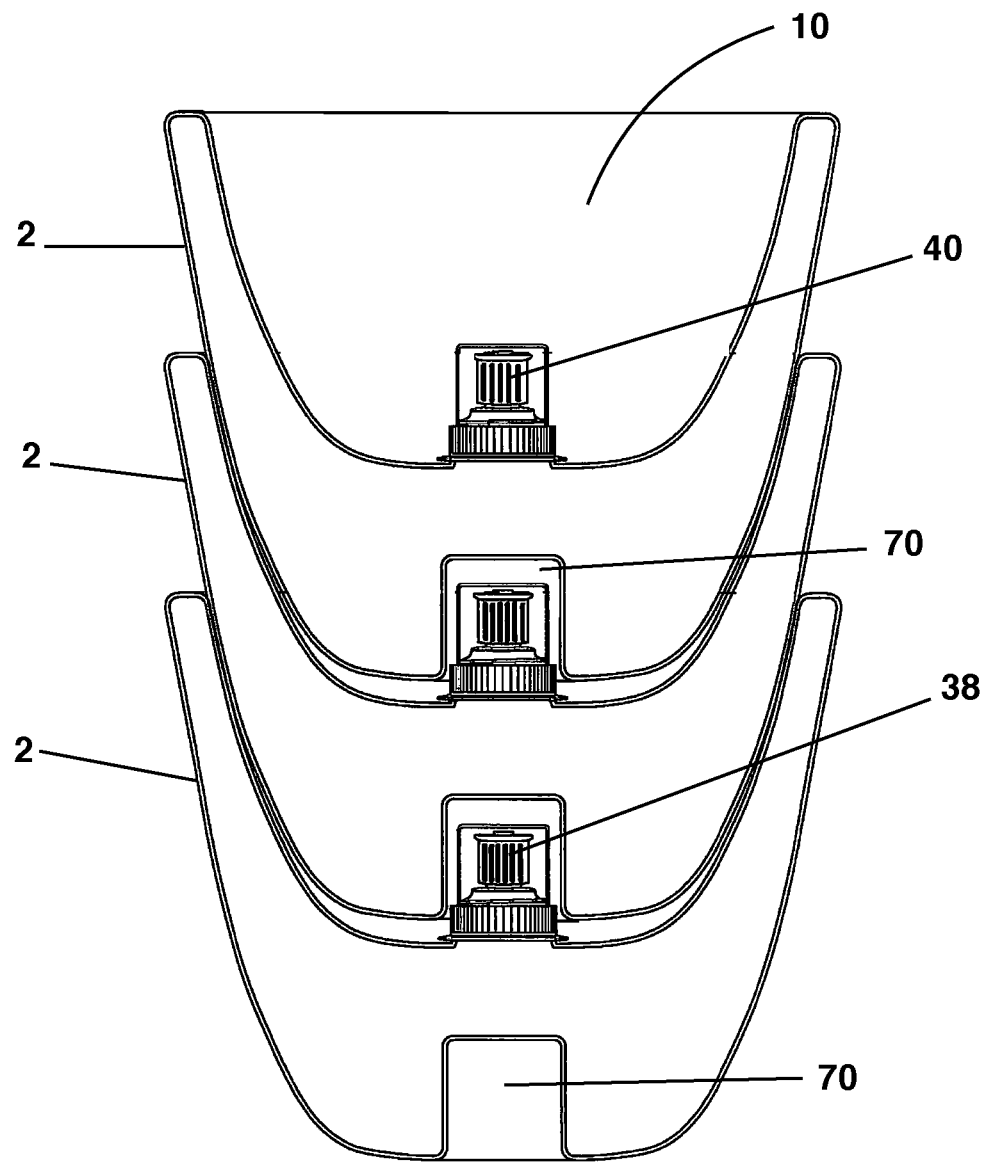
FIG. 12 is a sectional side view of a plurality of stacked pet bowls.

FIG. 12 shows that the pet bowl 2 may be stacked with other pet bowls 2. Stacking the pet bowls 2 allows for compact storage and transportation. Where the selectable closure 26 of one pet bowl 2 with interfere with the outside wall 22 of a second pet bowl 2, the second pet bowl 2 may include a recess 70 to receive the selectable closure 26 without interference. Stacking of the pet bowls 2 is possible because the circumference of the base 6 of the second pet bowl is less than the circumference of the open top 12 of the first pet bowl.

Figure 13:
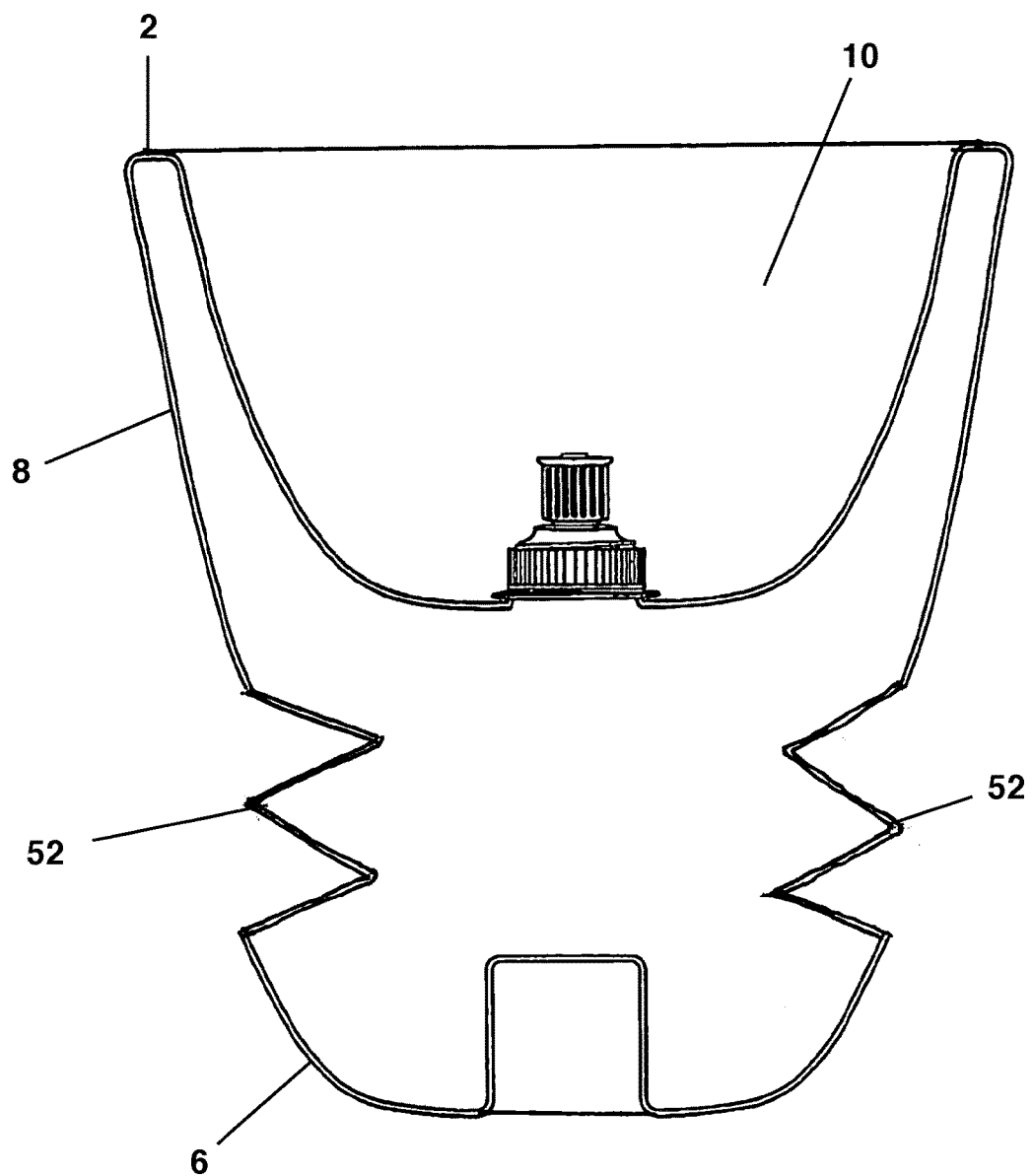
FIG. 13 is a sectional side view of the pet bowl with accordion folds.
Figure 14:
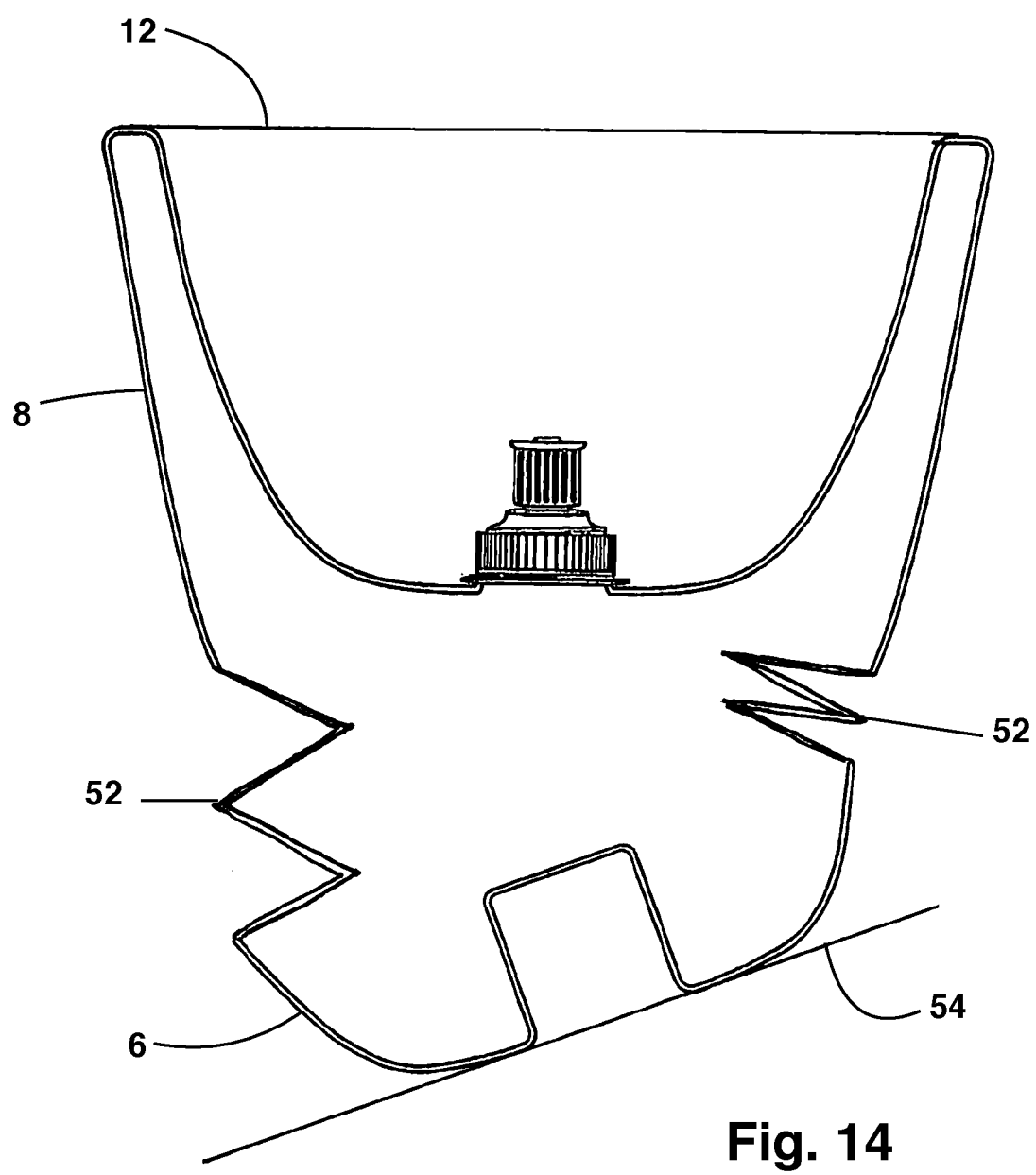
FIG. 14 is a sectional side view of the pet bowl on a slope with accordion folds.

FIGS. 13 and 14 illustrate that the body 4 of the pet bowl 2 may include a plurality of circumferential accordion folds 52. The accordion folds 52 allow the body 4 to expand to accommodate more water 16 and allow the pet owner to compress the body 4 without distorting the inside wall 20 and outside wall 22 to preserve the shape of the interior 10.

The accordion folds 52 also allow the base 6 to move with respect to the remainder of the body 4, as shown by FIG. 14. In FIG. 14, the base 6 rests upon a sloping surface 54. By compressing the accordion folds 52 on the uphill side of the sloping surface 54 and by extending the accordion folds 52 on the downhill side of the sloping surface 54, the pet owner is able to level the open top 12 of the body 4, rendering drinking from the interior 10 easier for the pet than would otherwise be the case.

Figure 15:
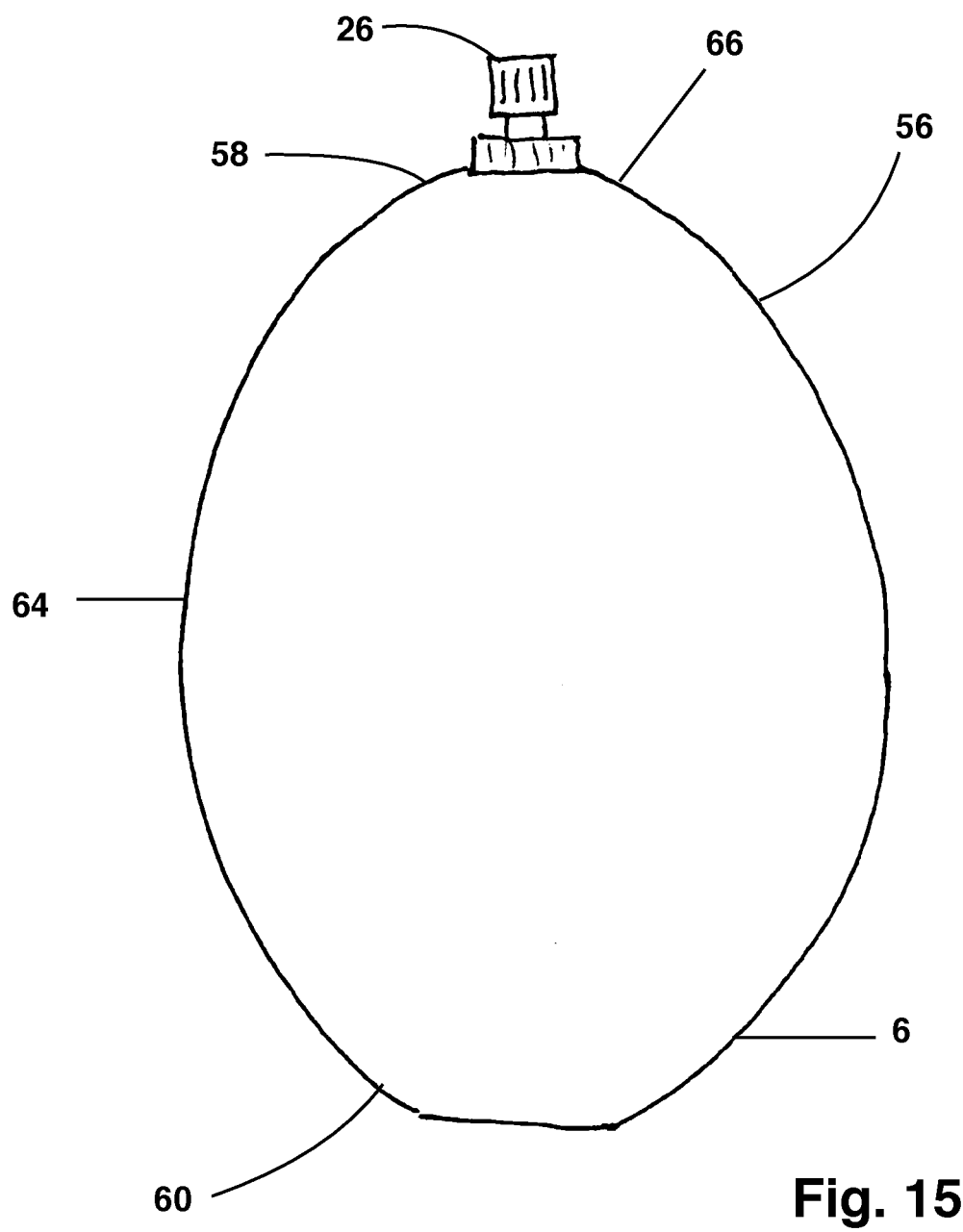
FIG. 15 is a side view of an alternative embodiment in the first position.
Figure 16:
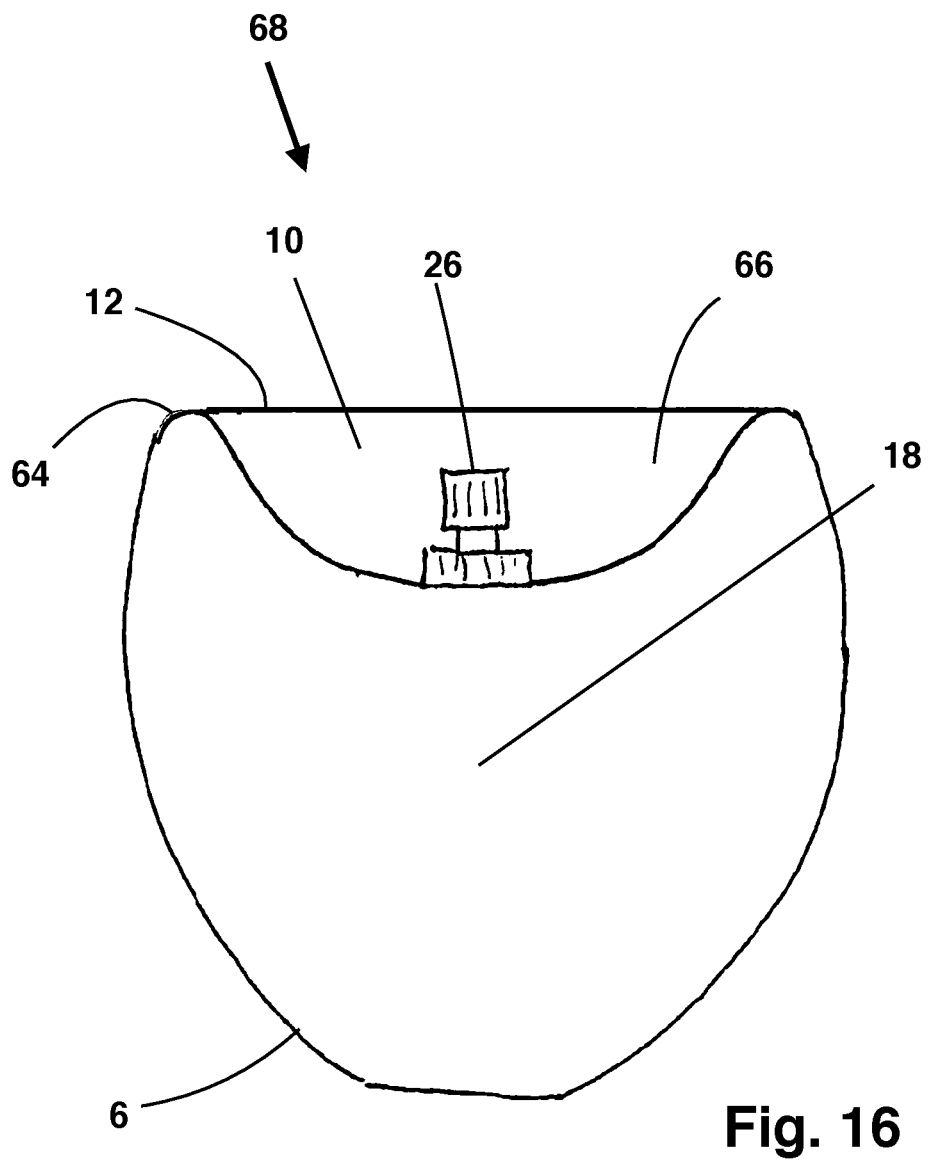
FIG. 16 is a sectional side view of the alternative embodiment in a second position.
Figure 17:
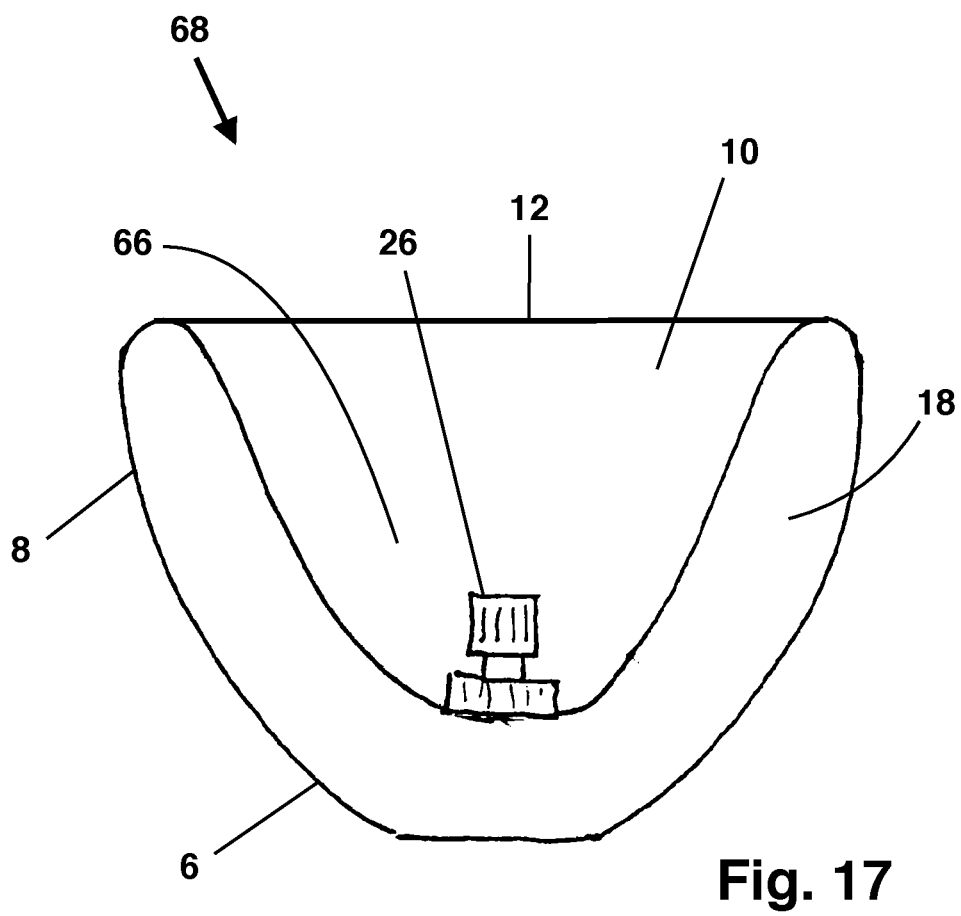
FIG. 17 is a sectional side view of the alternative embodiment in an extension of the second position.

FIGS. 15, 16 and 17 show an alternative embodiment. In the embodiment of FIGS. 15, 16 and 17, the Invention takes the form of a water bottle 56 that selectably collapses to form a pet bowl 2. FIG. 15 shows the water bottle 56. The water bottle 56 has a first end 58 and a second end 60. When the water bottle 56 is in the first position 62, shown by FIG. 15, the first end 58 and second end 60 are located at opposing ends of the water bottle 56 and are distal to one another. The water bottle 56 of FIG. 15 also defines a center portion 64 intermediate between the first end 58 and the second end 60. The body 4 of the water bottle 56 defines a circumference at the center portion 62 that is larger than the circumference at the first end 58 or the second end 60. The water bottle 56 also defines an outside surface 66 proximal to the first end 58.

FIG. 16 shows the body 4 in a second position 68 in which the body 4 defines a pet bowl 12. To achieve the second position 68, the pet owner moves the first end 58 toward the second end 60. The first end 58 collapses within the center portion 64 so that the distance between the center portion 64 and the second end 60 is greater than the distance between the first end 58 and the second end 60. The body 4 therefore defines a pet bowl 2 with an interior 10 and a raised open top 12. The outside surface 66 of the water bottle 56 proximal to the first end 58 now defines the inside surface 14 of the interior 10. The pet owner may discharge water from the reservoir 18 of the pet bowl 2 into the interior 10 through the selectable closure 26. The pet may drink the water 16 in the interior 10 through the open top 12.

FIG. 17 is similar to FIG. 16, except that the pet owner has extended the first end 58 toward the second end 60 so that the first end 58 is proximal to the second end 60. Moving the pet bowl 2 from the position of FIG. 14 to the position of FIG. 15 allows the pet owner to discharge water 16 from the reservoir 18 into the interior 10 of the pet bowl 2 while maintaining the shape of the interior 10.

Figure 18:
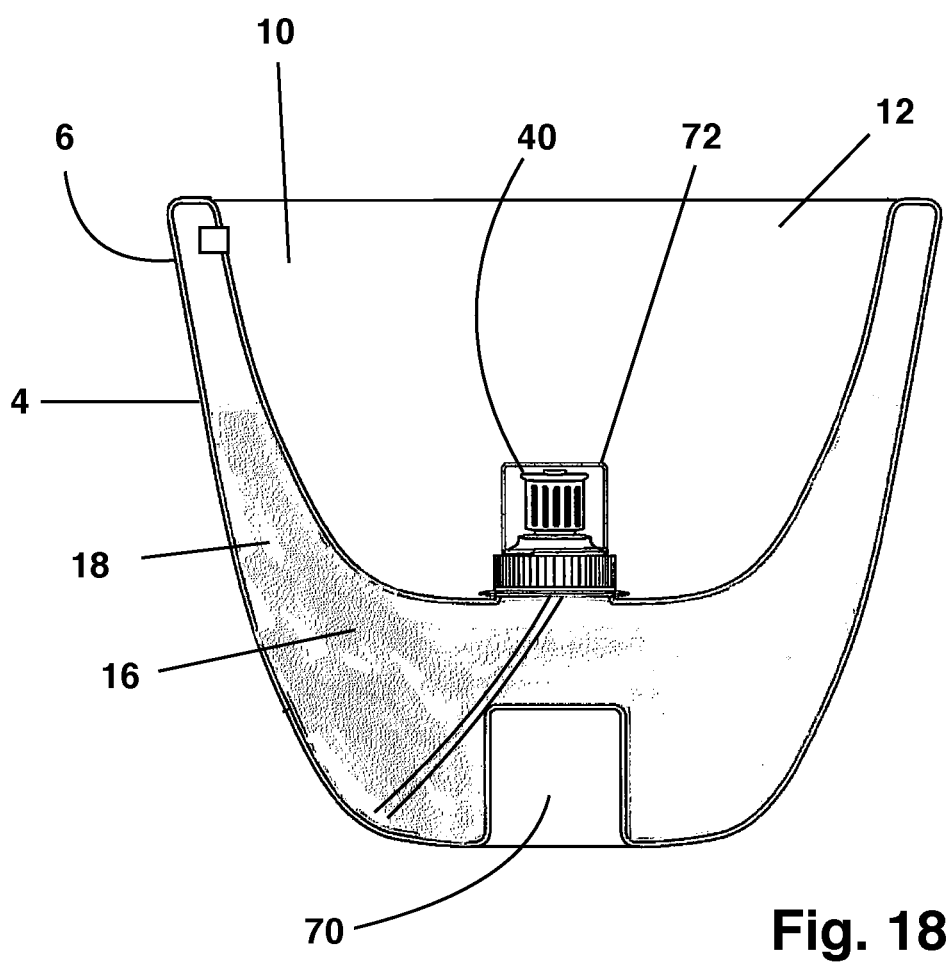
FIG. 18 is a cutaway side view of the pet bowl with a filled reservoir.
Figure 19:
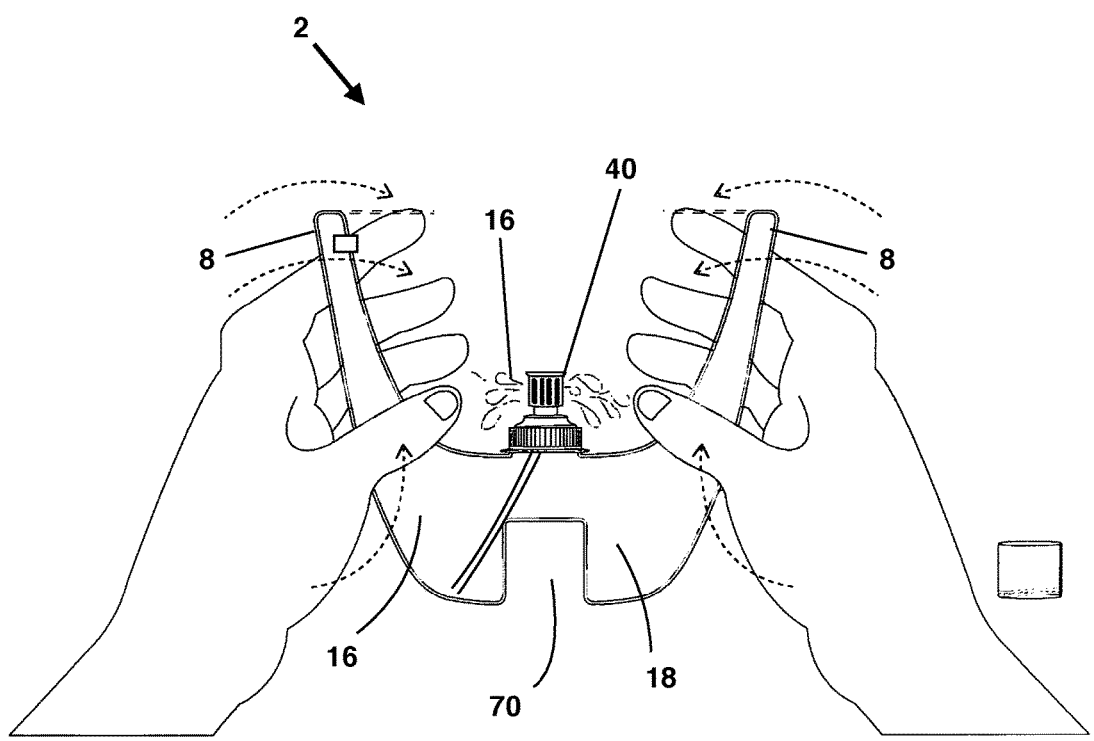
FIG. 19 is cutaway view of the pet bowl being compressed to expel the water from the reservoir.
Figure 20:
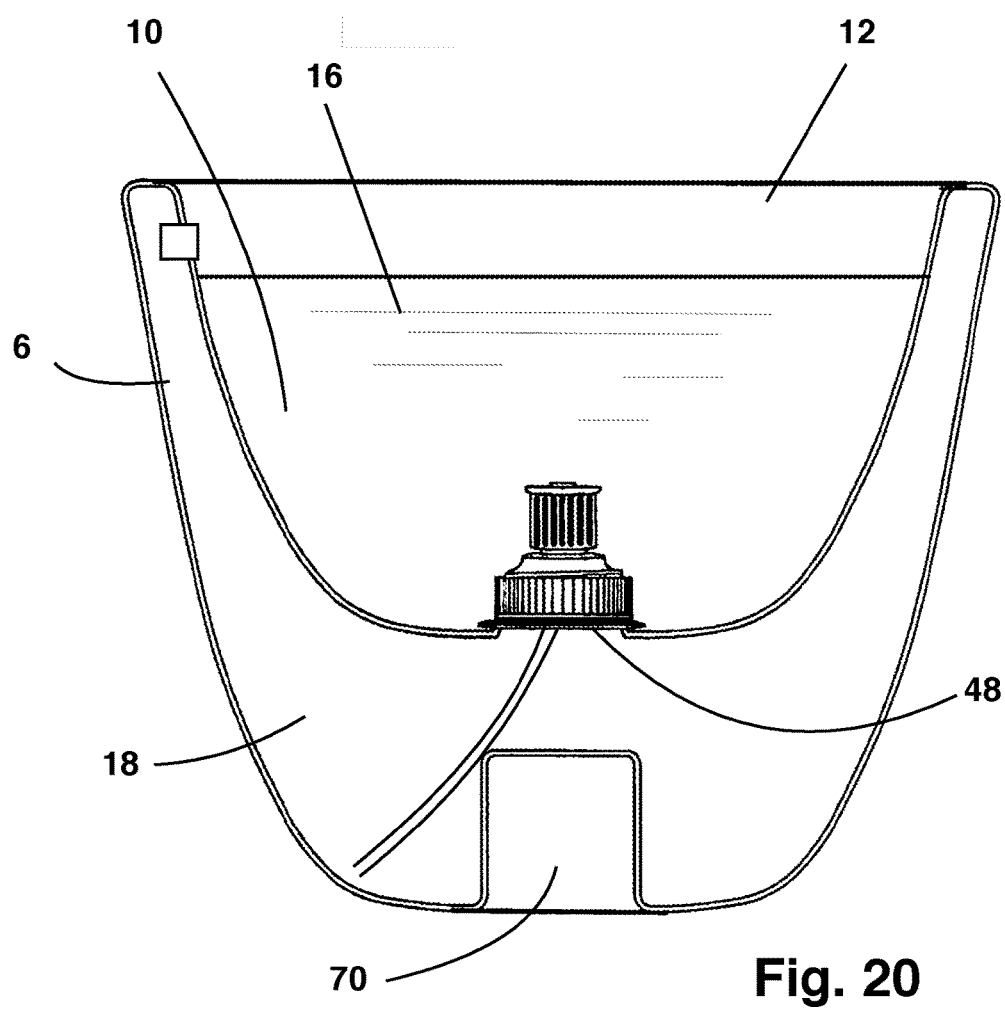
FIG. 20 is a sectional side view of the pet bowl with the interior filled from the reservoir.
Figure 21:
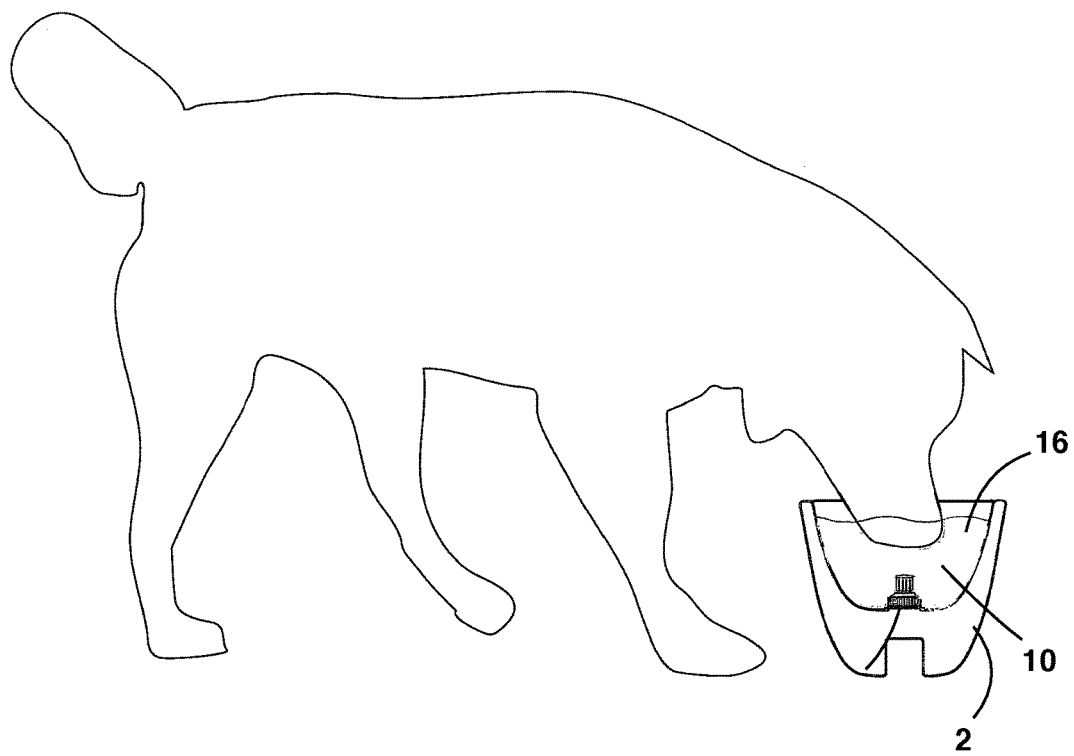
FIG. 21 is a view of a pet drinking from a pet bowl shown in sectional view 20.

FIGS. 18 through 21 show the prefilled single use pet bowl 2 of the Invention in use. FIG. 18 shows the prefilled pet bowl 2 ready for use. Water 16 is prefilled in the reservoir 18 defined by the body 4 of the pet bowl 2. The pull-to-open, push-to-close valve 40 is in the closed condition and is protected by a removable cap 72. As shown by FIG. 19, to use the pet bowl 2 the user removes the removable cap 72 and opens the pull-to-open, push-to-close valve 40. The user manually compresses the walls 8 and base 6 of the pet bowl 2 as indicated by the arrows of FIG. 19, expelling water 16 from the reservoir 18 and into the interior 10 of the pet bowl 2. FIG. 20 shows the pet bowl 2 with the interior 10 of the pet bowl 2 containing the water 16. A backflow limiting device 48 may prevent the water 16 from flowing through the valve 40 and into the reservoir 18. The body 4 may define a vent to allow makeup air to enter the reservoir 18 to make up the volume of the water 16 expelled into the interior 10 of the pet bowl 2. As shown by FIG. 21, the user can then make the filled pet bowl 2 available to the pet so that the pet may consume the water 16 contained within the interior 10 of the pet bowl 2. The user may close the pull-to-open, push-to-close valve 40, saving unused water 16 in the reservoir 18 for later use.

FIGS. 18-21 also show optional features of the Invention. FIGS. 18-21 show a straw 74 extending from the pull-to-open, push-to-close valve to the lowest portion of the reservoir 18. The straw 74 allows the user to expel substantially all of the water 16 in the reservoir 18. FIGS. 18-20 also show a make-up air closure 76. The make-up air closure 76 allows air into the reservoir 18 so that the air can replace expelled water 16 and so that the pet bowl 2 can return to its original size and shape, as shown by FIG. 20. Any suitable make-up air closure 76 may be used, such as a removable cap, a plug closure or a valve.

Figure 22:
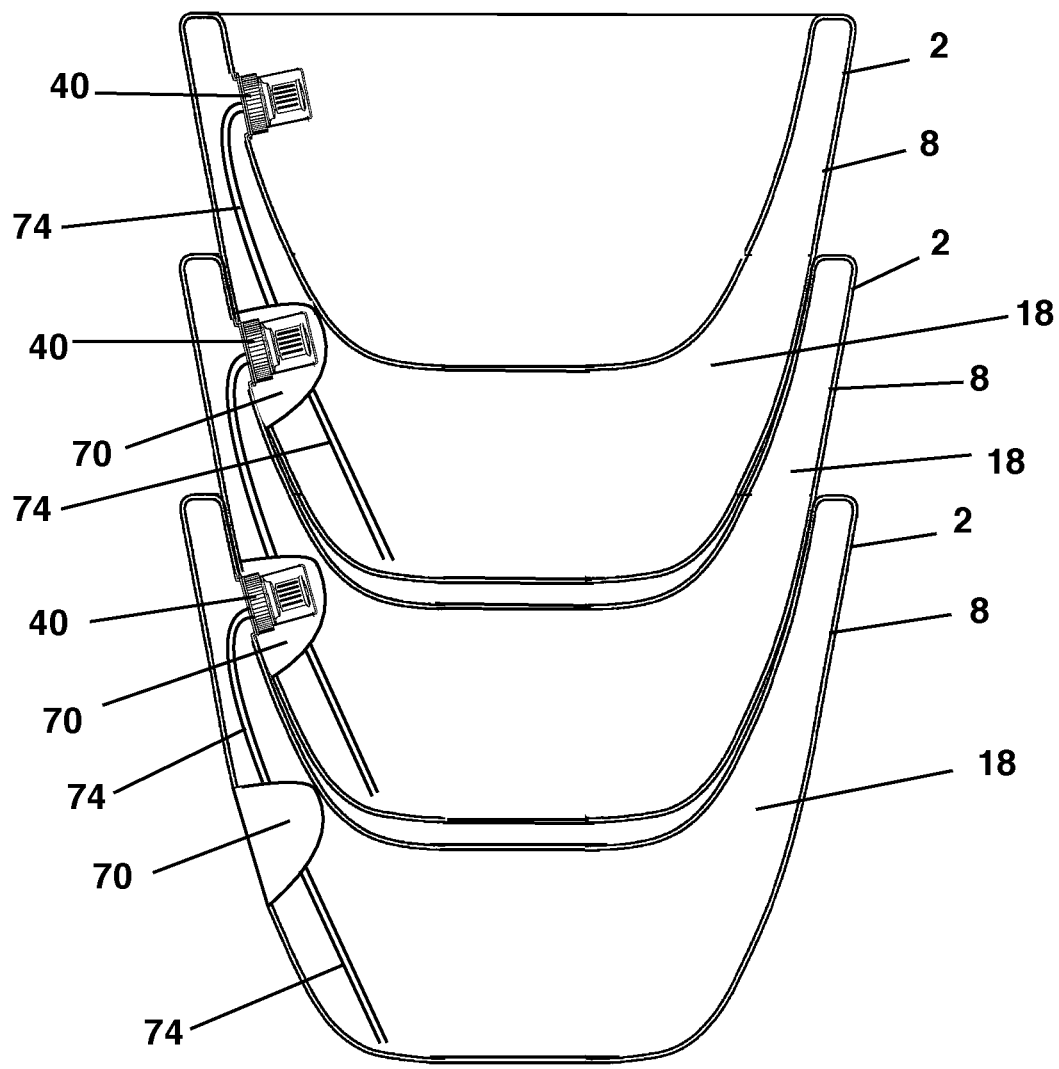
FIG. 22 is a sectional view of stacked pet bowls of an alternative embodiment.

FIG. 22 shows an alternative embodiment in which the pull-to-open, push-to-close valve 40 is located on the wall 8 of the interior 10 and communicates with the reservoir 18. Locating the valve 40 on the wall 8 allows make-up air to enter the reservoir 18 through the valve 40 so that the resilient pet bowl 2 can resiliently expand to its original shape after the user crushes the pet bowl 2 to expels water 16 from the reservoir 18. Also shown by FIG. 22 is straw 74 to allow the user to expel water 16 from the lowest portion of the reservoir 18.

FIG. 22 also shows that pet bowls 2 with valves 40 located on the wall 8 may be stacked. Recess 70 is located on the outside of the wall 8 of each pet bowl 2 to receive the valve 40 of another pet bowl 2 so that the bowls 2 may be stacked. As shown by FIG. 22, the recess 70 may be configured so that the valve 40 interferes with the wall 8 of the pet bowl 2 and resists vertical separation of the stacked pet bowls 2. From FIG. 22, the resilient walls 8 of the pet bowl 2 must be deformed to stack the pet bowls 2 or to separate stacked pet bowls 2, which tends to maintain the pet bowls 2 in the stacked condition. The stacked pet bowls 2 nonetheless may be readily separated for sale or use. Alternatively, the recess 70 may be configured not to interfere with the valve 40 so that the pet bowls 2 may be more easily separated vertically.

The body 4 of the Invention may be composed of any suitable material. Polyethylene terephalate (PET #1), commonly used for water bottles for human consumption, is believed to be suitable. Other materials believed to be suitable are high density polyethylene (HDPE), low density polyethylene (LDPE), polyvinyl chloride (PVC), polypropylene (PP) and polystyrene (PS). The body 4 may be composed of a resilient polymer, such as LDPE or PVC, so that the body 4 resumes its original shape when released in the manner of a squeeze bottle. The body 4 may be composed of a material that remains in the crushed condition when crushed, as in thin-walled PET.

LIST OF NUMBERED ELEMENTS

The following is a list of the numbered elements appearing in the specification and drawings.

pet bowl 2
body 4
base 6
wall 8
interior 10
open top 12
inside surface 14
water 16
reservoir 18
inside wall 20
outside wall 22
opening 24
selectable closure 26
screw cap 28
threads 30
removable plug 32
plug receptacle 34
bottom 36
valve 38
pull-to-open, push-to-close valve 40
arrows 42
barrel 44
valve openings 46
back flow prevention apparatus 48
check valve 50
accordion folds 52
sloping surface 54
water bottle 56
first end 58
second end 60
first position 62
center portion 64
outside surface proximal to the first end 66
second position 68
recess 70
removable cap 72
straw 74
make-up air inlet 76

I claim:

1. A prefilled pet bowl, the pet bowl comprising:
   a. a body, said body defining an interior of the pet bowl, said interior having an open top, said interior being configured to allow a pet to drink water from said interior;
   b. a reservoir defined by said body, said reservoir being enclosed within said body, said reservoir being configured to contain said water, said reservoir being prefilled with said water; and
   c. an opening, said opening providing a selectable fluid communication between said reservoir and said interior of the pet bowl, whereby said opening selectably allows said water to flow from said reservoir to said interior of the pet bowl and wherein the pet bowl is a one of a plurality of pet bowls, each of said plurality of pet bowls is structurally identical to each other of said plurality of pet bowls, said body of each of said plurality of pet bowls defines a wall and a base, each said wall and said base of each said pet bowl being configured to fit within said interior of each other said pet bowl, whereby each of said plurality of pet bowls is stackable.

2. The pet bowl of claim 1 wherein said opening of each said pet bowl has a selectable closure, said selectable closure allowing selectable sealing and unsealing of said opening by a user, said closure of each said pet bowl being located on said interior of each said pet bowl and extending into said interior of each said pet bowl, said body of each said pet bowl defining a recess, said recess being configured to receive said closure of each other said pet bowl when said pet bowls are stacked.

3. The pet bowl of claim 2 wherein said body of each of said plurality of pet bowls is deformable by said user, whereby said user may unseal said selectable closure and may deform said body of each of said plurality of pet bowls to expel all or a portion of said water through said opening and into said interior of each of said pet bowls, and whereby said user may seal said selectable closure without discharging all of said water contained within said reservoir into said interior of each of said pet bowls.

4. The pet bowl of claim 3 wherein said base and said wall define said reservoir of each of said plurality of pet bowls.

5. The pet bowl of claim 4 wherein said selectable closure is disposed at a bottom of said interior of each of said plurality of pet bowls and said recess is defined by said base of each of said plurality of pet bowls, whereby said plurality of pet bowls may be stacked and unstacked without interference between said selectable closure and said base of each of said plurality of pet bowls.

6. The pet bowl of claim 4 wherein said selectable closure is disposed on a wall of said interior of each of said plurality of pet bowls and said recess is defined by an outside of said wall of each of said plurality of pet bowls, said recess being configured to interfere with said valve during a separation of a one of said pet bowls from a stack of said plurality of pet bowls whereby a user will deform said wall or said base of one or more of said plurality of pet bowls to remove said one of said plurality of pet bowls from said stack.

7. A prefilled pet bowl, the pet bowl comprising:
a. a body, said body defining an interior of the pet bowl, said interior having an open top, said interior being configured to allow a pet to drink water from said interior;
b. a reservoir defined by said body, said reservoir being enclosed within said body, said reservoir being configured to contain said water, said reservoir being prefilled with said water; and
c. an opening, said opening providing a selectable fluid communication between said reservoir and said interior of the pet bowl, whereby said opening selectably allows said water to flow from said reservoir to said interior of the pet bowl, wherein said opening has a selectable closure located on said interior of said body, said selectable closure being a pull-to-open, push-to-close valve, said pull-to-open, push-to-close valve having a side discharge allowing selectable sealing and unsealing of said opening by a user and wherein said valve defines a plurality of side openings, said plurality of side openings being distributed about a circumference of said valve.

8. The pet bowl of claim 7 wherein said body is deformable by said user, whereby said user may unseal said pull-to-open, push-to-close valve and may deform said body to expel all or a portion of said water through said side openings and into said interior of the pet bowl, and whereby said user may seal said pull-to-open, push-to-close valve without discharging all of said water contained within said reservoir into said interior of the pet bowl.

9. The pet bowl of claim 7, the pet bowl further comprising: a back flow prevention apparatus, said back flow prevention apparatus being configured to prevent a flow of water from said interior of the pet bowl through said opening and into said reservoir.

10. The pet bowl of claim 9 wherein said back flow prevention apparatus is a check valve.

11. A prefilled pet bowl, the pet bowl comprising:
a. a body, said body defining an interior of the pet bowl, said interior having an open top, said interior being configured to allow a pet to drink water from said interior;
b. a reservoir defined by said body, said reservoir being enclosed within said body, said reservoir being configured to contain said water, said reservoir being prefilled with said water; and
c. an opening, said opening providing a selectable fluid communication between said reservoir and said interior of the pet bowl, whereby said opening selectably allows said water to flow from said reservoir to said interior of the pet bowl and wherein said body comprises: a wall and a base, said wall and said base defining said interior of the pet bowl, said base defining at least a portion of said reservoir, said base defining an accordion fold, said accordion fold being configured to allow a user to selectably collapse or extend said reservoir, whereby said user may move a bottom of the pet bowl with respect to said interior of the pet bowl.

12. The pet bowl of claim 11 wherein said accordion fold is configured to allow a user-selectable asymmetrical collapse and extension of said reservoir, whereby a user may selectably tilt said interior of the pet bowl with respect to said bottom of the pet bowl.

13. A prefilled pet bowl, the pet bowl comprising:
a. a body, said body defining an interior of the pet bowl, said interior having an open top, said interior being configured to allow a pet to drink water from said interior;
b. a reservoir defined by said body, said reservoir being enclosed within said body, said reservoir being configured to contain said water, said reservoir being prefilled with said water; and
c. an opening, said opening providing a selectable fluid communication between said reservoir and said interior of the pet bowl, whereby said opening selectably allows said water to flow from said reservoir to said interior of the pet bowl and wherein said body defines a first position and a second position, said body being collapsible between said first position and said second position, said body defining said interior when said body is in said second position, said body not defining said interior when said body is in said first position, wherein said body has a first end and a second end, said first end being distal to said second end in said first position and said first end being proximal to said second end in said second position, whereby said body defines a water bottle in said first position and defines the pet bowl in said second position.

14. The pet bowl of claim 13 wherein said body is collapsible between said first position and said second position.

15. The pet bowl of claim 14 wherein said body defines a center portion intermediate to said first end and said second end when said body is in said first position, each of said first end, said second end and said center portion having a circumference, said circumference of said center portion being greater than said circumference of said first end and said second end.

16. The pet bowl of claim 15 wherein said center portion of said body defines an open top of said interior of the pet bowl when said body is in said second position.

17. The pet bowl of claim 14 wherein said body defines an outside surface at said first end of said body when said body is in said first position, said outside surface defining an inside surface of said interior of the pet bowl when said body is in said second position.

18. The pet bowl of claim 17 wherein said opening is disposed on said inside surface of said interior of the pet bowl when said body is in said second position.

* * * * *